US011012824B2

(12) United States Patent
Abedini et al.

(10) Patent No.: US 11,012,824 B2
(45) Date of Patent: May 18, 2021

(54) COMMUNICATING MULTIPLE INSTANCES OF A MESSAGE IN A RANDOM MEDIUM ACCESS CONTROL SYSTEM

(71) Applicant: QUALCOMM Incorporated, San Diego, CA (US)

(72) Inventors: Navid Abedini, Somerset, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/380,571

(22) Filed: Apr. 10, 2019

(65) Prior Publication Data

US 2019/0320299 A1 Oct. 17, 2019

Related U.S. Application Data

(60) Provisional application No. 62/656,619, filed on Apr. 12, 2018.

(51) Int. Cl.
*H04B 7/06* (2006.01)
*H04W 4/12* (2009.01)
*H04L 1/18* (2006.01)

(52) U.S. Cl.
CPC ............ *H04W 4/12* (2013.01); *H04B 7/0617* (2013.01); *H04L 1/1812* (2013.01)

(58) Field of Classification Search
CPC .......... H04W 4/12; H04L 1/1812; H04L 1/08; H04L 5/0091; H04L 5/0044; H04L 5/0057; H04L 5/0048; H04L 5/0055; H04L 5/0062; H04B 7/0617; H04B 7/00
See application file for complete search history.

(56) References Cited

U.S. PATENT DOCUMENTS

| 2017/0070984 | A1* | 3/2017 | Lin | ........................ H04L 5/001 |
| 2017/0208616 | A1* | 7/2017 | Panteleev | ......... H04W 72/1263 |
| 2018/0213549 | A1* | 7/2018 | Kim | ........................ H04L 1/00 |
| 2019/0393988 | A1* | 12/2019 | Bae | ....................... H04L 1/1812 |
| 2020/0059327 | A1* | 2/2020 | Kini | ....................... H04L 1/1812 |

FOREIGN PATENT DOCUMENTS

| WO | 2010139842 A1 | 12/2010 |
| WO | 2017040092 A1 | 3/2017 |

OTHER PUBLICATIONS

International Search Report and Written Opinion—PCT/US2019/026975—ISA/EPO—dated Aug. 28, 2019.

\* cited by examiner

*Primary Examiner* — Lakeram Jangbahadur
(74) *Attorney, Agent, or Firm* — QUALCOMM Incorporated

(57) ABSTRACT

Various aspects of the present disclosure generally relate to wireless communication. In some aspects, a receiver may receive a first instance of a first message, wherein the first instance of the first message includes an indication of a plurality of resource sets to be used to communicate a corresponding plurality of instances of the first message, wherein each instance, of the plurality of instances, includes a copy of the first message; identify a resource set used to communicate a second instance of the first message based at least in part on the indication; and perform interference cancellation to obtain a second message based at least in part on identifying the resource set used to communicate the second instance of the first message. Numerous other aspects are provided.

30 Claims, 9 Drawing Sheets

COMMUNICATING MULTIPLE INSTANCES OF A MESSAGE IN A RANDOM MEDIUM ACCESS CONTROL SYSTEM

CROSS-REFERENCE TO RELATED APPLICATIONS UNDER 35 U.S.C. § 119

This application claims priority to U.S. Provisional Patent Application No. 62/656,619, filed Apr. 12, 2018, entitled "TECHNIQUES AND APPARATUSES FOR COMMUNICATING MULTIPLE INSTANCES OF A MESSAGE IN A RANDOM MEDIUM ACCESS CONTROL SYSTEM," which is hereby expressly incorporated by reference herein.

FIELD OF THE DISCLOSURE

Aspects of the present disclosure generally relate to wireless communication, and more particularly to techniques and apparatuses for communicating multiple instances of a message in a random medium access control system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a transmitter, may include determining a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted; and transmitting an instance of the message, wherein the instance of the message includes an indication of the plurality of resource sets.

In some aspects, a transmitter for wireless communication may include memory and one or more processors coupled to the memory. The memory and the one or more processors may be configured to determine a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted; and transmit an instance of the message, wherein the instance of the message includes an indication of the plurality of resource sets.

In some aspects, a non-transitory computer-readable medium may store one or more instructions for wireless communication. The one or more instructions, when executed by one or more processors of a transmitter, may cause the one or more processors to determine a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted; and transmit an instance of the message, wherein the instance of the message includes an indication of the plurality of resource sets.

In some aspects, an apparatus for wireless communication may include means for determining a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted; and means for transmitting an instance of the message, wherein the instance of the message includes an indication of the plurality of resource sets.

In some aspects, a method of wireless communication, performed by a receiver, may include receiving a first instance of a first message, wherein the first instance of the first message includes an indication of a plurality of resource sets to be used to communicate a corresponding plurality of instances of the first message, wherein each instance, of the plurality of instances, includes a copy of the first message; identifying a resource set used to communicate a second instance of the first message based at least in part on the indication; and performing interference cancellation to obtain a second message based at least in part on identifying the resource set used to communicate the second instance of the first message.

In some aspects, a receiver for wireless communication may include memory and one or more processors coupled to the memory. The memory and the one or more processors may be configured to receive a first instance of a first message, wherein the first instance of the first message includes an indication of a plurality of resource sets to be used to communicate a corresponding plurality of instances of the first message, wherein each instance, of the plurality of instances, includes a copy of the first message; identify a resource set used to communicate a second instance of the first message based at least in part on the indication; and perform interference cancellation to obtain a second message based at least in part on identifying the resource set used to communicate the second instance of the first message.

In some aspects, a non-transitory computer-readable medium may store one or more instructions for wireless communication. The one or more instructions, when executed by one or more processors of a receiver, may cause the one or more processors to receive a first instance of a first message, wherein the first instance of the first message includes an indication of a plurality of resource sets to be used to communicate a corresponding plurality of instances of the first message, wherein each instance, of the plurality of instances, includes a copy of the first message; identify a resource set used to communicate a second instance of the first message based at least in part on the indication; and perform interference cancellation to obtain a second message based at least in part on identifying the resource set used to communicate the second instance of the first message.

In some aspects, an apparatus for wireless communication may include means for receiving a first instance of a first message, wherein the first instance of the first message includes an indication of a plurality of resource sets to be used to communicate a corresponding plurality of instances of the first message, wherein each instance, of the plurality of instances, includes a copy of the first message; means for identifying a resource set used to communicate a second instance of the first message based at least in part on the indication; and means for performing interference cancellation to obtain a second message based at least in part on identifying the resource set used to communicate the second instance of the first message.

Aspects generally include a method, apparatus, system, computer program product, non-transitory computer-readable medium, user equipment, base station, transmitter, receiver, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
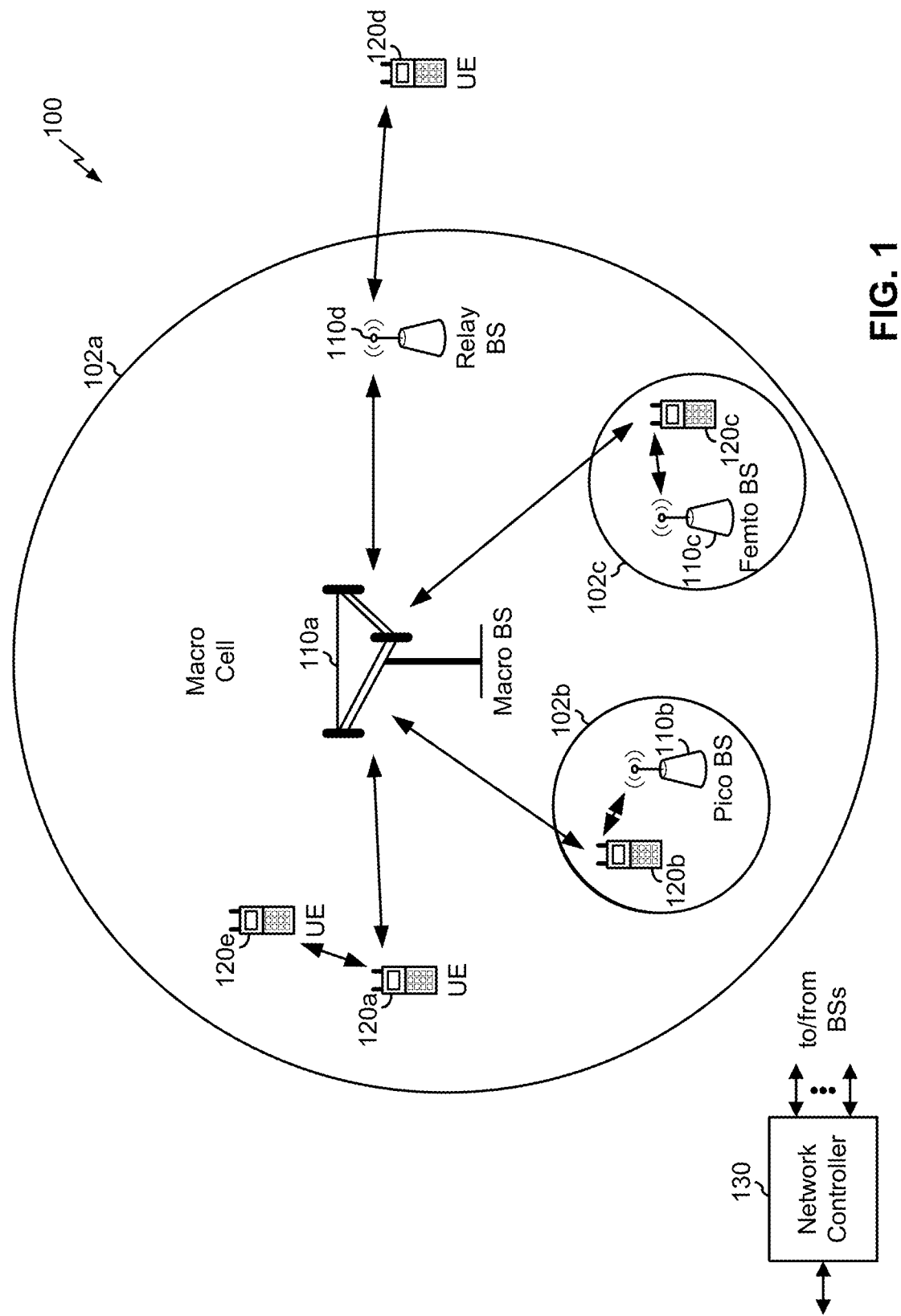
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
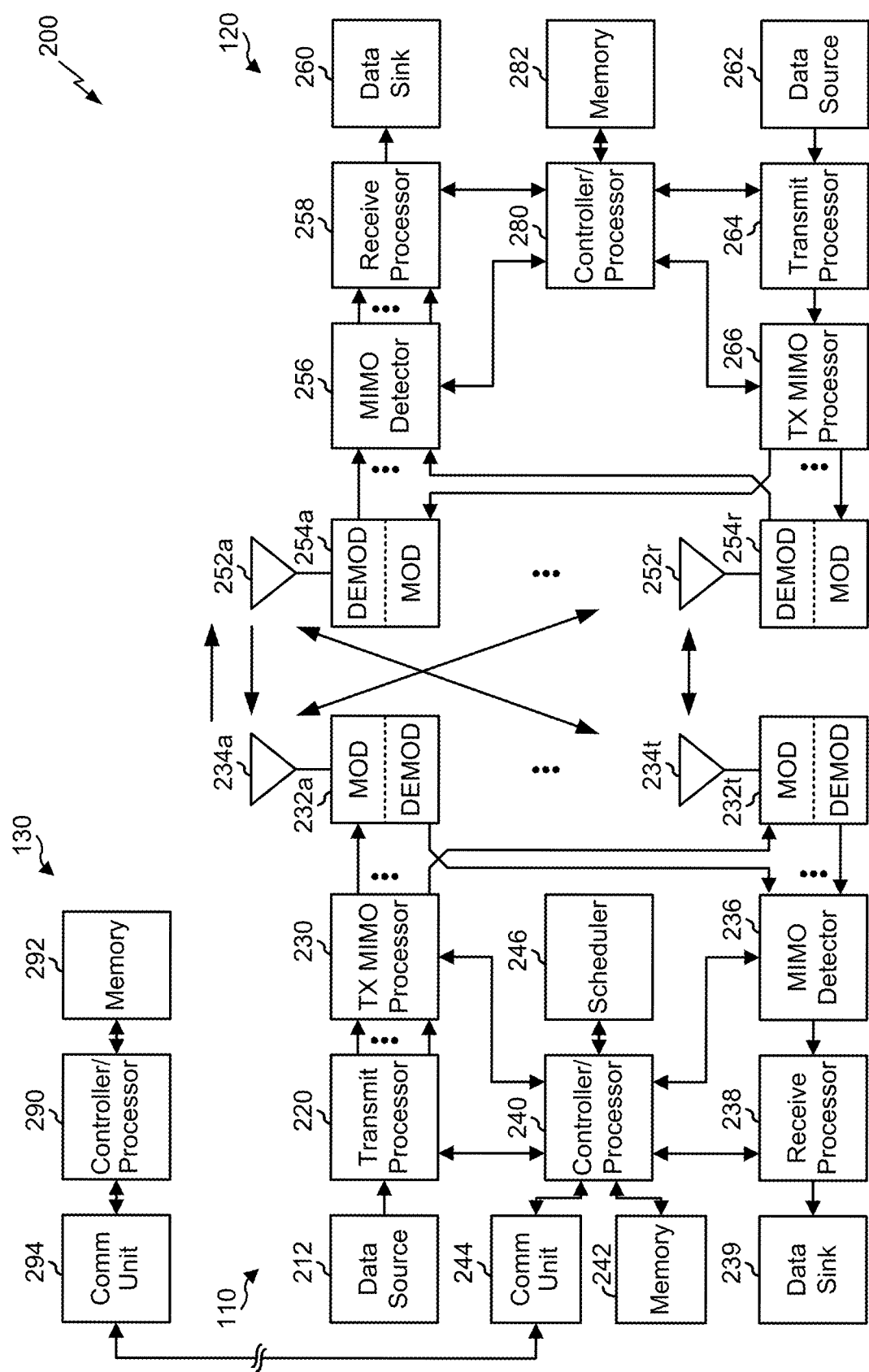
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with communicating multiple instances of a message in a random medium access control system, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, a transmitter (e.g., UE 120 and/or base station 110) may include means for determining a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted; means for transmitting an instance of the message, wherein the instance of the message includes an indication of the plurality of resource sets; and/or the like. In some aspects, such means may include one or more components of UE 120 and/or base station 110 described in connection with FIG. 2.

In some aspects, a receiver (e.g., UE 120 and/or base station 110) may include means for receiving a first instance of a first message, wherein the first instance of the first message includes an indication of a plurality of resource sets to be used to communicate a corresponding plurality of instances of the first message, wherein each instance, of the plurality of instances, includes a copy of the first message; means for identifying a resource set used to communicate a second instance of the first message based at least in part on the indication; means for performing interference cancellation to obtain a second message based at least in part on identifying the resource set used to communicate the second instance of the first message; and/or the like. In some aspects, such means may include one or more components of UE 120 and/or base station 110 described in connection with FIG. 2.

As indicated above, FIG. 2 is provided merely as an example. Other examples are possible and may differ from what was described with regard to FIG. 2.

Figure 3A:
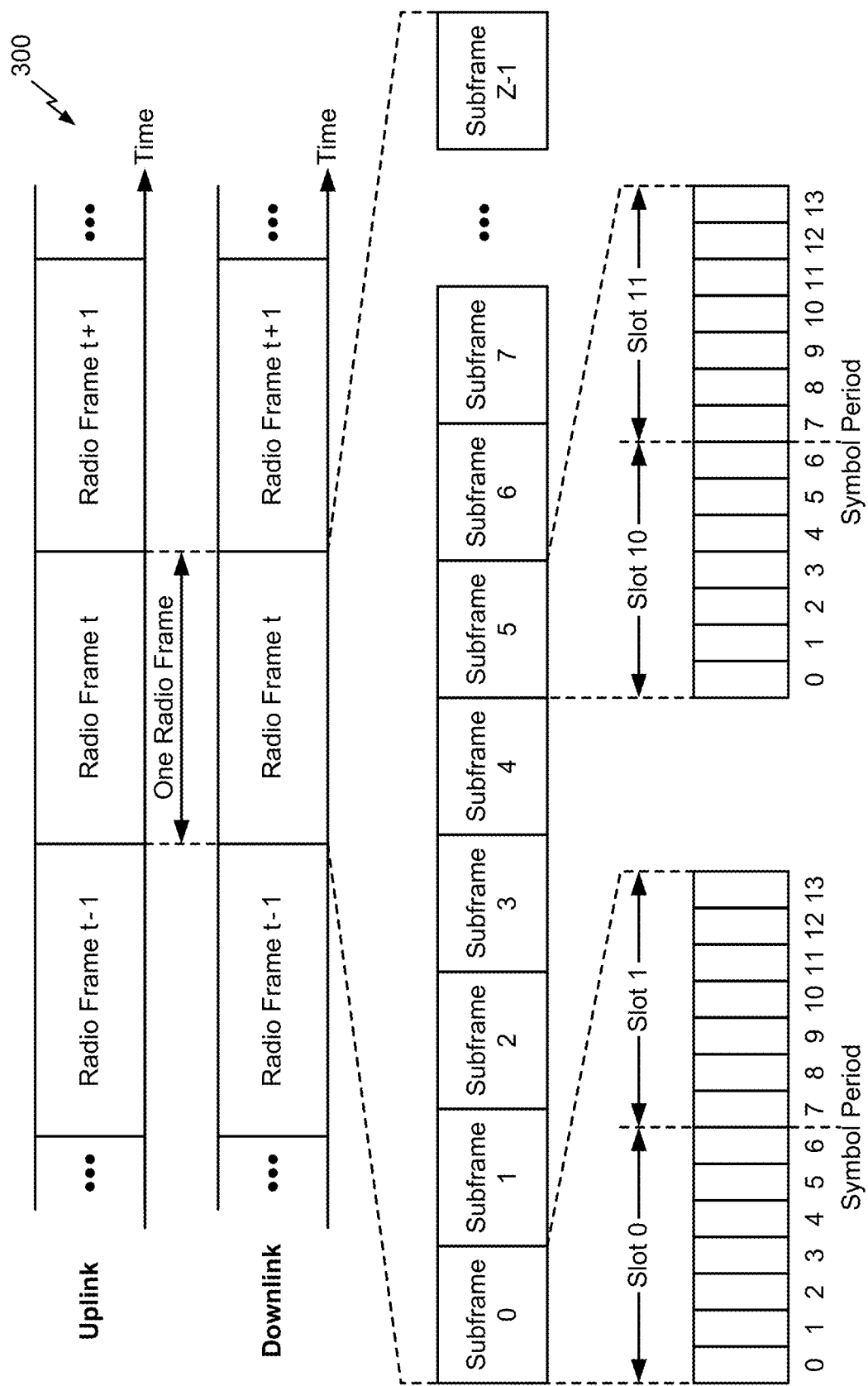
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
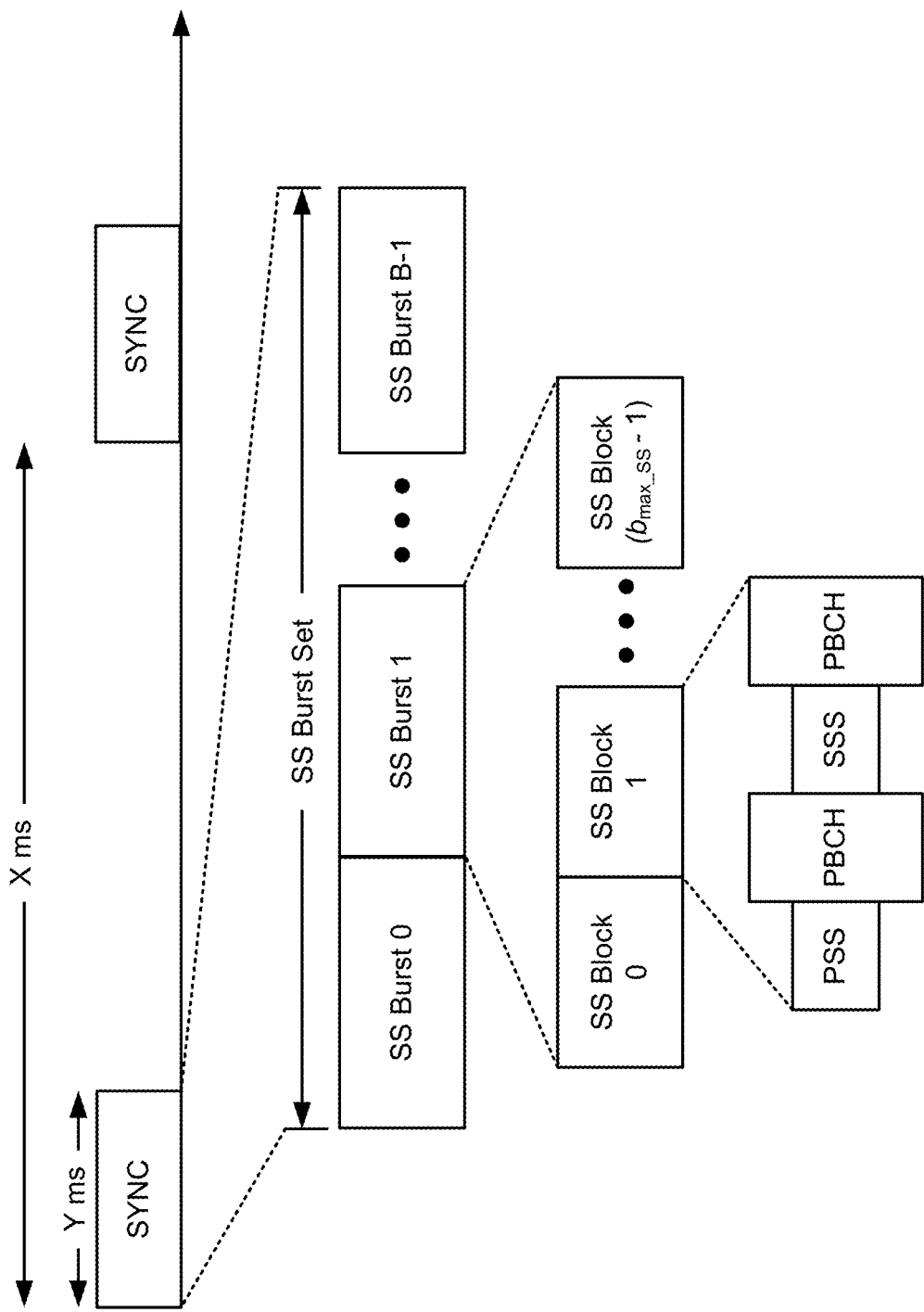
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
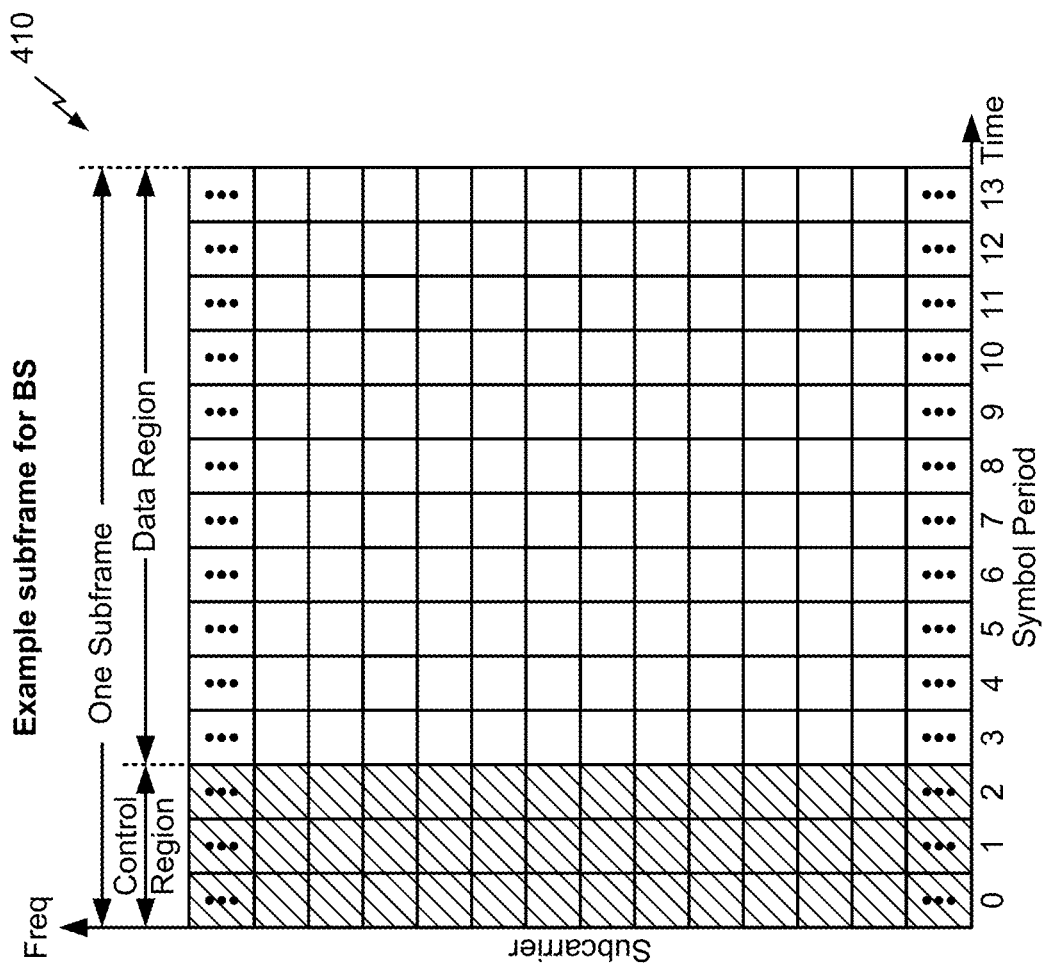
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
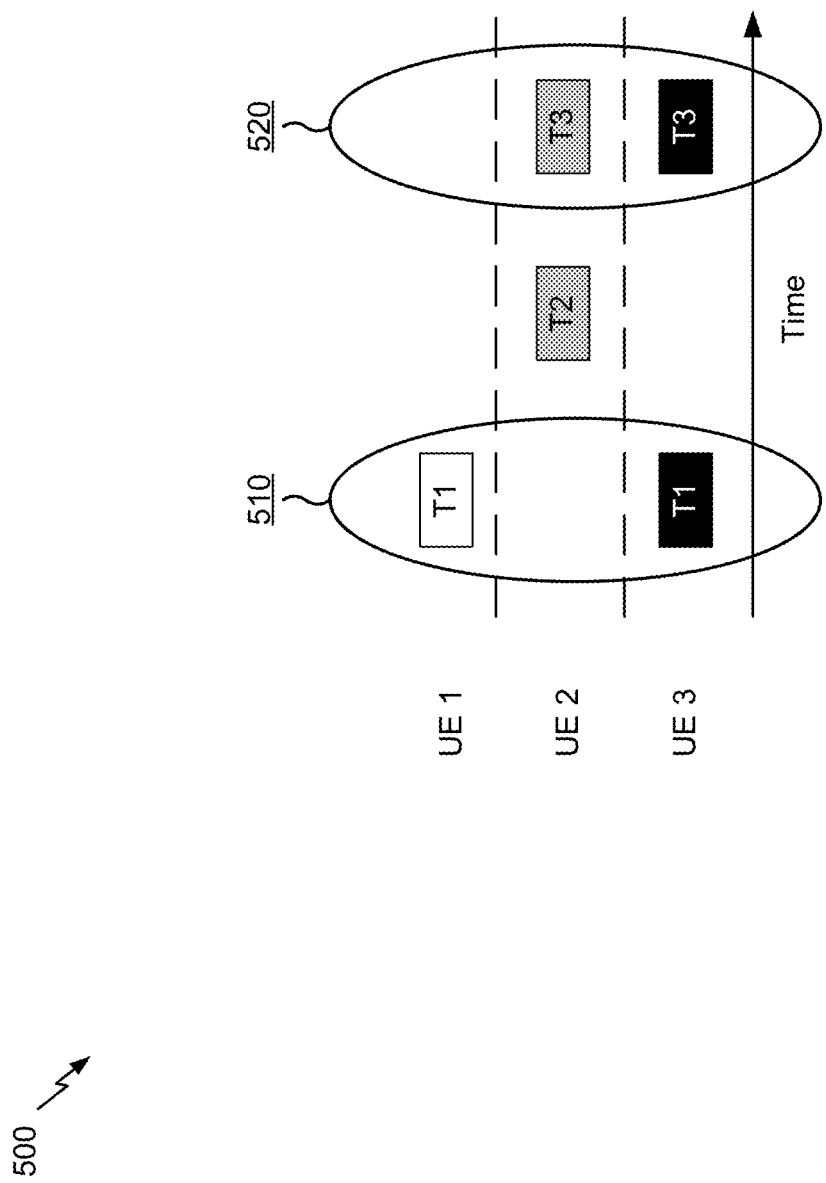
FIG. 5 is a diagram illustrating an example of collisions between communications in a random medium access control system, in accordance with various aspects of the present disclosure.

FIG. 5 is a diagram illustrating an example 500 of collisions between communications in a random medium access control system, in accordance with various aspects of the present disclosure.

A random medium access control system may refer to a communication system where wireless communication devices (e.g., transmitters and receivers, such as UEs 120 and/or base stations 110) share a medium (e.g., time, frequency, and/or spatial resources on an air interface) in a random and/or distributed manner. In such a system, communications may not be scheduled by a centralized scheduler or coordinator (e.g., a scheduling entity, such as a base station 110). Examples of a random medium access control system include an ad hoc network, a device-to-device (D2D) network (e.g., a peer-to-peer network, a UE-to-UE network, and/or the like), a vehicle-to-everything (V2X) network (e.g., cellular V2X (CV2X), vehicle-to-vehicle (V2V), vehicle-to-infrastructure (V2I), vehicle-to-pedestrian (V2P), and/or the like), a backhaul network (e.g., a wireless backhaul network), a network that uses unlicensed radio frequency spectrum (e.g., LTE-U), and/or the like. In some cases, these types of networks may be so dynamic that establishing a scheduling entity and/or assigning a scheduling entity role may require significant signaling overhead. Furthermore, some types of communications, such as URLLC, may have stringent latency and/or reliability requirements that would not be satisfied due to delays associated with a scheduling process. In these scenarios, a random medium access control system may be used.

However, in a random medium access control system, communications between transmitters may have a high likelihood of colliding (e.g., causing interference) with one another, as compared to a system that uses scheduling, because such communications are transmitted randomly and/or are not scheduled by a centralized scheduler. For example, if two or more transmitters select the same or overlapping resources to transmit communications, then a receiver may not be able to receive one or more of the communications due to interference.

For example, as shown in FIG. 5, a first UE (shown as UE 1), a second UE (shown as UE 2), and a third UE (shown as UE 3) may operate in a random medium access control system. As shown by reference number 510, and as an example, a transmission by the first UE may collide with a transmission by the third UE when both transmissions are transmitted in the same time interval or an overlapping time interval, shown as T1. Similarly, as shown by reference number 520, a transmission by the second UE may collide with a transmission by the third UE when both transmissions are transmitted in the same time interval or an overlapping time interval, shown as T3. A receiver may be unable to correctly receive and/or decode the communications in these time intervals due to interference, thereby reducing system performance (e.g., increasing latency, increasing an error rate, reducing reliability, requiring additional network resources for retransmissions, and/or the like).

As will be described in more detail below, some techniques and apparatuses described herein improve performance in a random medium access control system. For example, some techniques and apparatuses described herein permit a transmitter to transmit multiple instances, of a message, that indicate resources used for transmission of other instances of the message. If a receiver successfully receives one instance of the message, the receiver may use that instance to identify other instances, and may perform interference cancellation to obtain other messages that collide with those instances. In this way, latency may be reduced, an error rate may be reduced, reliability may be increased, network resources may be conserved due to fewer retransmissions, and/or the like. Additional details are described below.

As indicated above, FIG. 5 is provided as an example. Other examples are possible and may differ from what was described with respect to FIG. 5.

Figure 6:
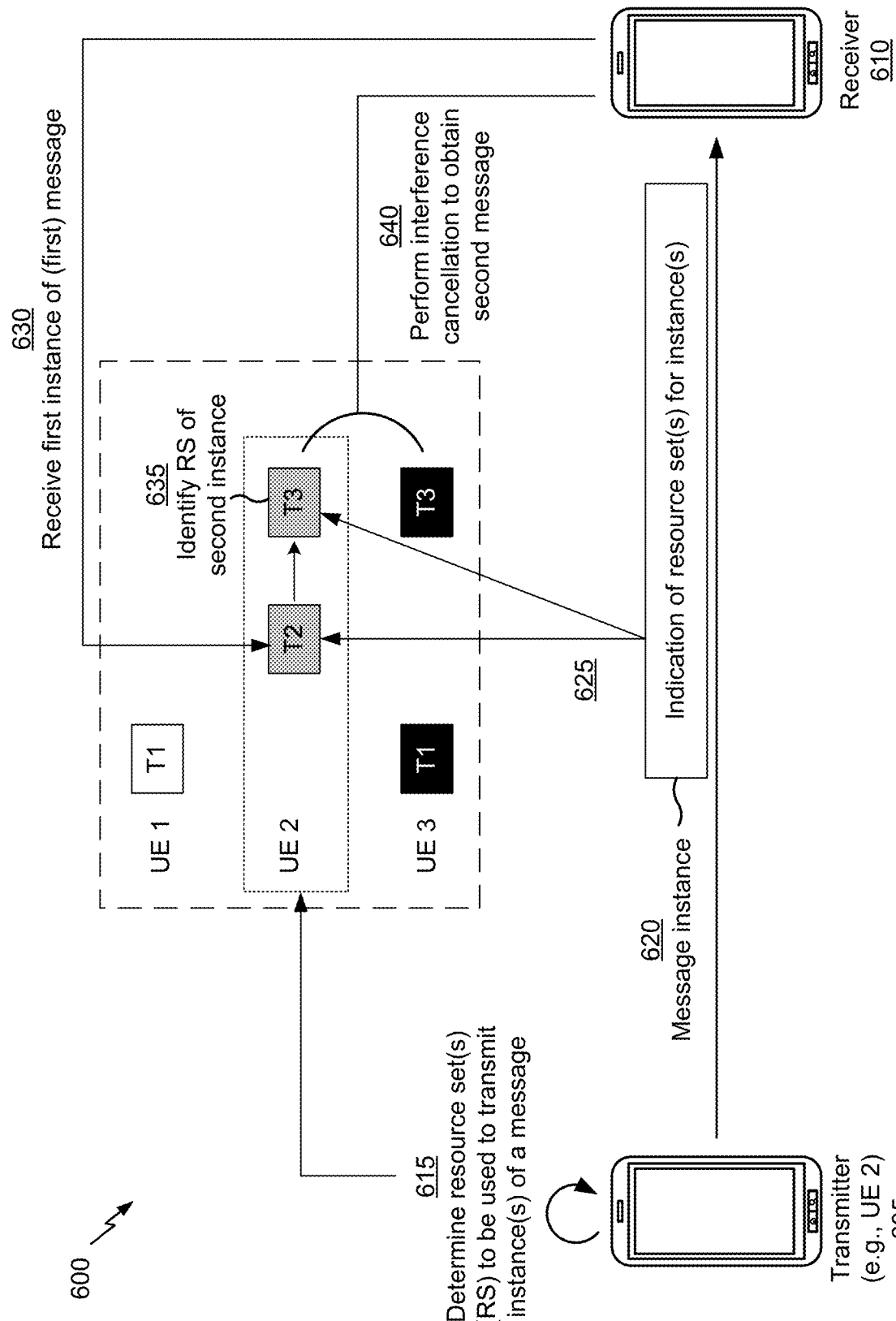
FIG. 6 is a diagram illustrating an example relating to communicating multiple instances of a message in a random medium access control system, in accordance with various aspects of the present disclosure.

FIG. 6 is a diagram illustrating an example 600 relating to communicating multiple instances of a message in a random medium access control system, in accordance with various aspects of the present disclosure.

As shown in FIG. 6, a transmitter 605 may communicate with a receiver 610 in a random medium access control system. In FIG. 6, the transmitter 605 and the receiver 610 are both shown as UEs (e.g., UEs 120), which may be the case in a D2D network, a V2X network, and/or the like. However, in some aspects, the transmitter 605 and the receiver 610 may both be base stations (e.g., base stations 110), such as in a wireless backhaul network and/or the like. Alternatively, in some aspects, the transmitter 605 may be a UE 120 and the receiver 610 may be a base station 110, or the transmitter 605 may be a base station 110 and the receiver 610 may be a UE 120.

As shown by reference number 615, the transmitter 605 may determine one or more resource sets to be used to transmit a corresponding one or more instances of a message. In some aspects, each instance includes a copy of the message. For example, each instance may be an identical copy of the message. In this case, a particular instance may indicate a resource set corresponding to that particular instance and one or more resource sets corresponding to one or more other instances. Alternatively, each instance may include a control portion, which may be different across different instances, and a data portion, which may be identical across different instances. In this case, a particular instance may not indicate a resource set corresponding to that particular instance, and may indicate only one or more resources sets corresponding to one or more other instances (e.g., all other instances, only instances in the future, only instances in the past, and/or the like).

In some aspects, the one or more resource sets includes a plurality of resource sets (e.g., multiple resource sets). In the random medium access control system, the resource sets to be used for transmission and/or reception of instances of the message may not be scheduled, indicated by the transmitter 605, or stored by the receiver 610 prior to transmission of an initial instance of the message by the transmitter 605 and/or reception of the initial instance of the message by the receiver 610.

In FIG. 6, the transmitter 605 may be a UE 120 shown as UE 2. As shown, the transmitter 605 may identify a first resource set to be used to transmit a first instance of the message at a time T2 and a second resource set to be used to transmit a second instance of the message at a time T3. In some aspects, each instance corresponds to a resource set via which that instance is to be transmitted. A resource set may include, for example, a time resource (e.g., a time location), a frequency resource (e.g., a frequency location), a spatial resource (e.g., a beam), and/or the like.

In some aspects, the transmitter 605 may determine the one or more resource sets for a time window. For example, the transmitter 605 may determine a number of resource sets to be transmitted in a time window, and may determine the resources, for those resource sets, in the time window. In this case, if the transmitter 605 does not receive an acknowledgement (ACK) or receives a negative acknowledgement (NACK) for the transmitted instances, then the transmitter 605 may determine one or more resources sets for another time window.

In some aspects, the transmitter 605 may determine the one or more resource sets based at least in part on a traffic type associated with the message. The transmitter 605 may determine the traffic type based at least in part on a latency requirement associated with the message, a reliability requirement associated with the message, whether the message includes control plane information (e.g., control information), whether the message includes user plane information (e.g., data), whether the message is a unicast message, whether the message is a multicast message or a broadcast message, and/or the like. In some aspects, the traffic type may be an eMBB traffic type. In some aspects, the traffic type may be a URLLC traffic type.

In some aspects, a greater number of instances (e.g., within a time window) may be used to transmit higher priority messages (e.g., URLLC messages, messages with a lower latency requirement, messages with a higher reliability requirement, control plane messages, and/or the like) as compared to lower priority messages (e.g., eMBB messages, messages with a higher latency requirement, messages with a lower reliability requirement, user plane messages, and/or the like). In some aspects, the transmitter 605 may determine the one or more resource sets based at least in part on determining a number of instances, of the message, to be transmitted. For example, each instance may correspond to a resource set via which that instance is transmitted. In some aspects, the transmitter 605 may determine to transmit a single instance of the message. In some aspects, the transmitter 605 may determine to transmit multiple instances of the message.

In some aspects, the transmitter 605 may determine the one or more resource sets based at least in part on selection of a pseudo-random resource set pattern (e.g., because transmission occurs on a random medium access control system). Additionally, or alternatively, the transmitter 605 may determine the one or more resource sets based at least in part on a random selection of a resource set pattern from a set of preconfigured resource set patterns (e.g., stored in memory of the transmitter 605). Additionally, or alternatively, the transmitter 605 may determine the one or more resource sets based at least in part on an identifier associated with the transmitter 605 (e.g., a UE identifier, a base station identifier, a device identifier and/or the like), an identifier associated with the receiver 610 (e.g., a UE identifier, a base station identifier, a device identifier and/or the like), an identifier associated with a channel via which the transmitter communicates (e.g., a channel identifier, such as a downlink channel identifier, an uplink channel identifier, a sidelink channel identifier, and/or the like), and/or the like. For example, the transmitter 605 may select a pseudo-random resource set pattern using the identifier as a seed, may select a resource set pattern from a set of preconfigured resource set patterns using the identifier, and/or the like.

Additionally, or alternatively, the transmitter 605 may determine the one or more resource sets based at least in part on a measurement of an energy level or an interference level associated with available resources. For example, the transmitter 605 may measure energy levels on multiple resources, such as multiple frequencies and/or multiple beams, and may select one or more resources with an energy level less than or equal to a threshold (e.g., the lowest measured energy level) to reduce the likelihood of a collision. Additionally, or alternatively, the transmitter 605 may determine the one or more resource sets based at least in part on an indication received from another device (e.g., the receiver 610 or another device, such as a base station 110 or scheduling entity).

As shown by reference number 620, the transmitter 605 may transmit, and the receiver 610 may receive, an instance of the message. As shown, the instance of the message may include an indication of the one or more resource sets to be used to transmit the one or more instances of the message. In some aspects, the indication may explicitly indicate the resource sets used for the instances of the message. For example, the indication may indicate a set of time values (e.g., which may be indicated using a time offset from a reference time, such as the start of a time window), a set of frequency values (e.g., which may be indicated using an absolute frequency value or an offset from a particular frequency, such as a center frequency of a frequency window), a set of beam identifiers, and/or the like. In this way, the resource sets may be flexibly configured and indicated.

Additionally, or alternatively, the indication may indicate the resources sets, used for the instances of the message, using an index value. For example, the index value may map to a resource set pattern (e.g., a pattern of time resources, frequency resources, beam resources, and/or the like). In some aspects, the transmitter 605 and the receiver 610 may store a table that maps different index values to different resource set patterns. In this case, the transmitter 605 may use the table to determine an index value to be transmitted (e.g., based at least in part on a resource set pattern to be used to transmit the instances of the message), and the receiver 610 may use the table to look up a resource set pattern using a received index value. In this way, network resources may be conserved as compared to explicitly indicating the resource sets.

In some aspects, the indication may indicate a set of time resources, a set of frequency resources, a set of spatial resources (e.g., beams), and/or the like, to be used to transmit a corresponding set of instances of the message. In some aspects, a spatial resource (e.g., a beam) may be indicated using a beamforming pattern indication. The beamforming pattern indication may indicate, for example, that an instance is to be transmitted using a pseudo-omnidirectional beam, that an instance is to be transmitted using a narrow band, that an instance is to be transmitted using a particular beam indicated using a beam identifier (e.g., that indicates a direction of the beam), a beam-sweeping pattern to be used for transmission of instances, and/or the like.

In some aspects, the indication may indicate the number of instances, of the message, to be transmitted. Additionally, or alternatively, the indication may indicate a modulation and coding scheme (MCS) to be used for one or more instances (e.g., all of the instances when all instances use the same MCS), one or more transmission power control (TPC) parameters to be used for one or more instances (e.g., which may be the same across all instances or different for different instances) a hybrid automatic repeat request (HARQ) acknowledgement or negative acknowledgement (ACK/NACK) configuration to be used for one or more instances, and/or the like. The HARQ ACK/NACK configuration may indicate, for example, whether a single ACK/NACK feedback is to be used across all instances (e.g., when one instance is successfully received), whether different ACK/NACK feedback is to be used for different instances, one or more resources to be used for ACK/NACK feedback, a timeline for ACK/NACK feedback, and/or the like. In some aspects, the transmitter 605 may determine the number of instances, the MCS, the one or more TPC parameters, and/or the HARQ ACK/NACK configuration based at least in part on a traffic type associated with the message, in a similar manner as described above.

As shown by reference number 625, in example 600, the transmitter 605 may transmit the first instance at a first time and may transmit the second instance at a second time. Both the first instance and the second instance may include an indication of the first resource set used to transmit the first instance and the second resource set used to transmit the second instance.

As shown by reference number 630, the receiver 610 may receive a first instance of the message. For purposes of explanation, this message may be referred to as a first message. The receiver may receive the first instance via the first resource set (e.g., at a first time, via a first frequency, on a first beam, and/or the like). As described above, the first instance of the first message may indicate (e.g., using an explicit indication, using an index, and/or the like) one or more resource sets corresponding to one or more instances of the first message. For example, the first instance may indicate a set of time resources, a set of frequency resources, a set of beams, and/or the like, to be used for transmission and/or reception of a corresponding set of instances of the first message.

As shown by reference number 635, the receiver 610 may use the indication in the first instance of the first message to identify a resource set used to communicate a second instance of the first message. For example, the second instance may be communicated via a second resource set, such as at a second time, via a second frequency, via a second beam, and/or the like. Because the first instance includes information that identifies resource sets for other instances, the receiver 610 may use this information to identify a resource set for the second instance. In some aspects, the resource set for the second instance may be explicitly indicated in the first instance. In some aspects, the resource set for the second instance may be indicated using an index value, and the receiver 610 may use the index value to look up the resource set for the second instance (e.g., using a table stored by the receiver 610).

As shown by reference number 640, the receiver 610 may perform interference cancellation to obtain a second message based at least in part on identifying the resource set used to communicate the second instance of the first message. In some aspects, the receiver 610 may detect a collision between the second message and the second instance of the first message, and may perform the interference cancellation based at least in part on detecting the collision. For example, the receiver 610 may receive the second message and the second instance of the first message in a same transmission time interval (TTI) (e.g., simultaneously or concurrently in the same TTI, overlapping in the same TTI, and/or the like). The TTI may include, for example, a subframe, a slot, a set of symbols, and/or the like.

When the second message and the second instance of the first message collide, the receiver 610 may be unable to correctly receive and/or decode the second message and/or the second instance of the first message unless the receiver 610 has information about the content of the second message and/or the second instance of the first message. As described above, since the second instance is a copy of the first instance (e.g., includes the same content), then the receiver 610 may obtain information about the content of the second instance from the first instance, and may use this information to perform interference cancellation to cancel out the second instance and obtain the second message. In this way, network and device performance may be improved.

As shown in FIG. 6, in some aspects, the second message is received after the first instance of the first message. For example, the receiver 610 may receive the first instance of the first message at a time T2, and may receive the second message (and the second instance of the first message) at a later time T3. In this case, the receiver 610 may use information obtained from the first instance to perform interference cancellation to obtain the second message received at the later time.

However, in some aspects, the second message is received before the first instance of the first message. For example, the receiver 610 may receive the first instance of the first message at a time T2, and may receive the second message (and the second instance of the first message) at an earlier time T1. In this case, the receiver 610 may use information obtained from the first instance to perform interference cancellation to obtain the second message received at the earlier time. For example, the information received at the earlier time (e.g., the second message and the second instance of the first message) may be stored in a buffer of the receiver 610, and the receiver 610 may perform interference cancellation on the information stored in the buffer to obtain the second message.

Additionally, or alternatively, the receiver 610 may perform multiple iterations of interference cancellation to obtain multiple messages. For example, in FIG. 6, there is a collision between a first message (from UE 2) and a second message (from UE 3) at time T3, and there is a collision between the second message (e.g., another instance of the second message) and a third message (from UE 1) at time T1. However, there is no collision at time T2, so the receiver 610 may obtain a first instance of the first message at time T2, may use the first instance to identify a location of the second instance of the first message at time T3, and may perform interference cancellation to obtain an instance of the second message at time T3, as described above. The receiver 610 may then use the instance of the second message at time T3 to identify a location of another instance of the second message at time T1, and may perform interference cancellation to obtain the third message (from UE 1) at time T1. In this way, network and device performance may be further improved.

In some aspects, the receiver 610 may not perform interference cancellation. For example, if the receiver 610 does not detect a collision between a message (or an instance of the message) and an instance of another message, then the receiver 610 may not have a need to perform interference cancellation. Alternatively, in some cases, only a single instance of a message may be transmitted. In this case, the single instance may indicate that there are no other instances of the message, and/or may not indicate resource sets for other instances, and the receiver 610 may not perform interference cancellation when such a single instance is received.

In some aspects, the receiver 610 may use information received in an instance of a message to process one or more messages (e.g., the message and/or one or more other messages). The processing may include performing interference cancellation to obtain another message, as described above. In some aspects, the receiver 610 may perform the interference cancellation based at least in part on one or more TPC parameters indicated in the instance. Additionally, or alternatively, the processing may include transmitting HARQ ACK/NACK feedback for the instance or a group of instances according to a HARQ ACK/NACK configuration indicated in the instance. Additionally, or alternatively, the processing may include demodulating and/or decoding one or more instances based at least in part on an MCS included in the instance. Additionally, or alternatively, the processing may include ignoring (e.g., skipping decoding of) one or more instances of a message after a single instance of the message is successfully received. In this way, resources of the receiver 610 (e.g., processing power, memory, battery power, and/or the like) may be conserved.

As indicated above, FIG. 6 is provided as an example. Other examples are possible and may differ from what was described with respect to FIG. 6.

Figure 7:
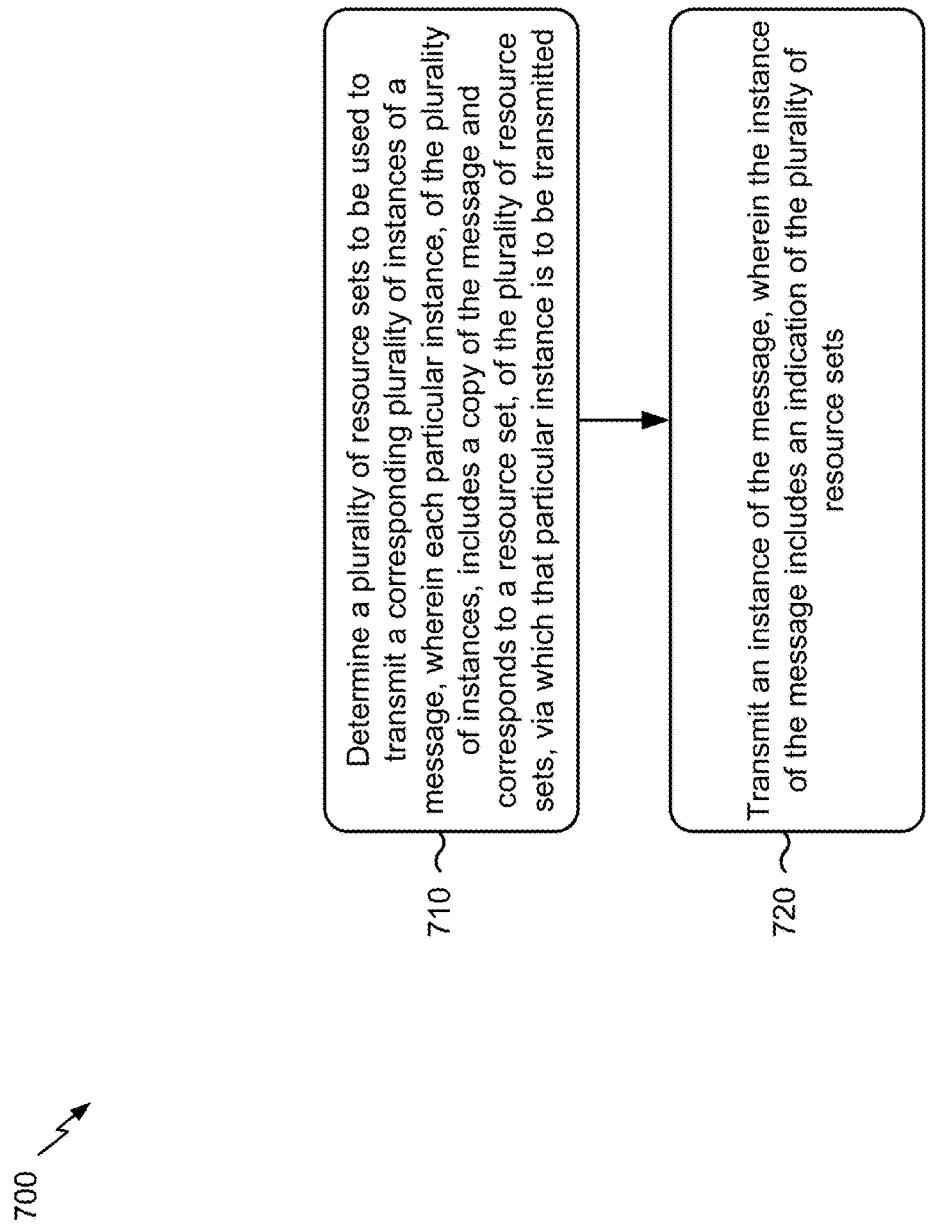
FIGS. 7 and 8 are diagrams illustrating example processes relating to communicating multiple instances of a message in a random medium access control system, in accordance with various aspects of the present disclosure.

FIG. 7 is a diagram illustrating an example process 700 performed, for example, by a transmitter, in accordance with various aspects of the present disclosure. Example process 700 is an example where a transmitter (e.g., UE 120, base station 110, and/or the like) performs operations associated with communicating multiple instances of a message in a random medium access control system.

As shown in FIG. 7, in some aspects, process 700 may include determining a plurality of resource sets to be used to transmit a corresponding plurality of instances of a message, wherein each particular instance, of the plurality of instances, includes a copy of the message and corresponds to a resource set, of the plurality of resource sets, via which that particular instance is to be transmitted (block 710). For example, the transmitter (e.g., using controller/processor 240, controller/processor 280, and/or the like) may determine a plurality of resource sets to be used to transmit a corresponding plurality of instances of a message, as described above in connection with FIG. 6. In some aspects, each particular instance, of the plurality of instances, includes a copy of the message. In some aspects, each particular instance, of the plurality of instances, corresponds to a resource set, of the plurality of resource sets, via which that particular instance is to be transmitted.

As further shown in FIG. 7, in some aspects, process 700 may include transmitting an instance of the message, wherein the instance of the message includes an indication of the plurality of resource sets (block 720). For example, the transmitter (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit an instance of the message, as described above in connection with FIG. 6. In some aspects, the instance of the message includes an indication of the plurality of resource sets.

Process 700 may include additional aspects, such as any single aspect or any combination of aspects described below and/or in connection with one or more other processes described elsewhere herein.

In a first aspect, the plurality of resource sets are determined for a time window. In a second aspect, alone or in combination with the first aspect, the indication explicitly indicates the plurality of resource sets. In a third aspect, alone or in combination with one or more of the first through second aspects, the indication indicates the plurality of resource sets using an index, wherein the index maps to a resource set pattern. In a fourth aspect, alone or in combination with one or more of the first through third aspects, the transmitter operates in a random medium access control system where the plurality of resource sets are not indicated to or stored by a receiver of the instance prior to transmission of an initial instance, of the plurality of instances, by the transmitter.

In a fifth aspect, alone or in combination with one or more of the first through fourth aspects, the plurality of resource sets are determined based at least in part on a traffic type associated with the message. In a sixth aspect, alone or in combination with one or more of the first through fifth aspects, the traffic type is determined based at least in part on at least one of: a latency requirement associated with the message, a reliability requirement associated with the message, whether the message includes control plane information, whether the message includes user plane information, whether the message is a unicast message, whether the message is a multicast message or a broadcast message, or a combination thereof.

In a seventh aspect, alone or in combination with one or more of the first through sixth aspects, the plurality of resource sets are determined based at least in part on at least one of: a selection of a pseudo-random resource set pattern, a random selection of a resource set pattern from a set of preconfigured resource set patterns, an identifier associated with the transmitter, a receiver of the message, or a channel via which the transmitter communicates, a measurement of an energy level or an interference level associated with available resources, an indication received from another device, or a combination thereof. In an eighth aspect, alone or in combination with one or more of the first through seventh aspects, the plurality of resource sets are determined based at least in part on a determination of a number of instances of the message to be transmitted. In a ninth aspect, alone or in combination with one or more of the first through eighth aspects, the indication further indicates the number of instances.

In a tenth aspect, alone or in combination with one or more of the first through ninth aspects, each resource set, of the plurality of resource sets, indicates at least one of a time resource, a frequency resource, or a beam to be used for transmission of a corresponding instance of the message. In an eleventh aspect, alone or in combination with one or more of the first through tenth aspects, the beam is indicated using a beamforming pattern indication that indicates at least one of a pseudo-omnidirectional beam, a narrow beam, a set of directions for a set of beams, or a beam-sweeping pattern.

In a twelfth aspect, alone or in combination with one or more of the first through eleventh aspects, the indication further indicates: a number of instances of the message, a modulation and coding scheme (MCS) to be used for the plurality of instances, one or more transmission power control (TPC) parameters to be used for the plurality of instances, a hybrid automatic repeat request (HARQ) acknowledgement or negative acknowledgement (ACK/NACK) configuration to be used for the plurality of instances, or a combination thereof. In a thirteenth aspect, alone or in combination with one or more of the first through twelfth aspects, at least one of the number of instances, the MCS, the one or more TPC parameters, or the HARQ ACK/NACK configuration are determined based at least in part on a traffic type associated with the message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
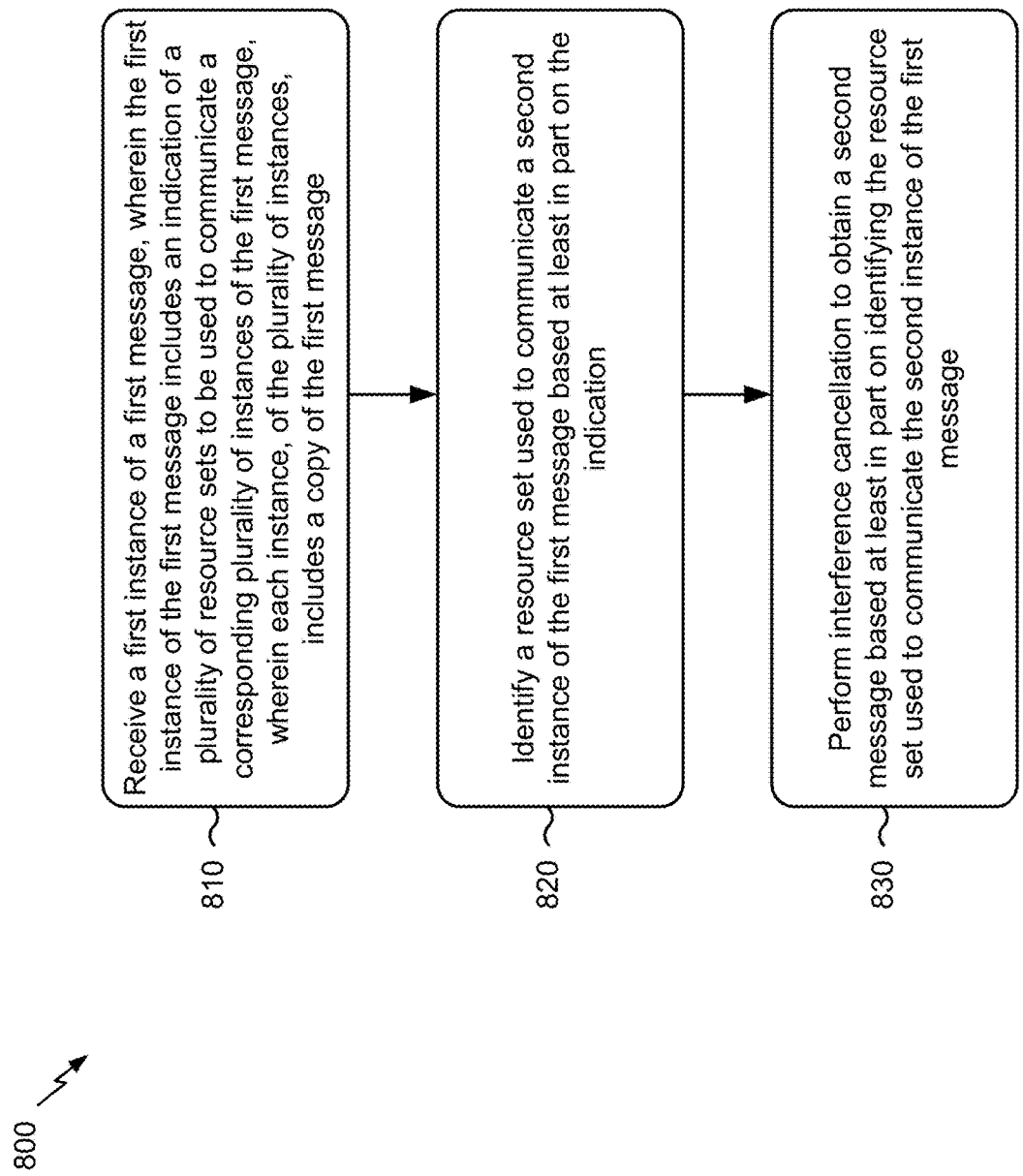

FIG. 8 is a diagram illustrating an example process 800 performed, for example, by a receiver, in accordance with various aspects of the present disclosure. Example process 800 is an example where a receiver (e.g., UE 120, base station 110, and/or the like) performs operations associated with communicating multiple instances of a message in a random medium access control system.

As shown in FIG. 8, in some aspects, process 800 may include receiving a first instance of a first message, wherein the first instance of the first message includes an indication of a plurality of resource sets to be used to communicate a corresponding plurality of instances of the first message, wherein each instance, of the plurality of instances, includes a copy of the first message (block 810). For example, the receiver (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a first instance of a first message, as described above in connection with FIG. 6. In some aspects, the first instance of the first message includes an indication of a plurality of resource sets to be used to communicate a corresponding plurality of instances of the first message. In some aspects, each instance, of the plurality of instances, includes a copy of the first message.

As further shown in FIG. 8, in some aspects, process 800 may include identifying a resource set used to communicate a second instance of the first message based at least in part on the indication (block 820). For example, the receiver (e.g., using controller/processor 240, controller/processor 280, and/or the like) may identify a resource set used to communicate a second instance of the first message based at least in part on the indication, as described above in connection with FIG. 6.

As further shown in FIG. 8, in some aspects, process 800 may include performing interference cancellation to obtain a second message based at least in part on identifying the resource set used to communicate the second instance of the first message (block 830). For example, the receiver (e.g., using controller/processor 240, controller/processor 280, and/or the like) may perform interference cancellation to obtain a second message based at least in part on identifying the resource set used to communicate the second instance of the first message, as described above in connection with FIG. 6.

Process 800 may include additional aspects, such as any single aspect or any combination of aspects described below and/or in connection with one or more other processes described elsewhere herein.

In a first aspect, the interference cancellation is performed based at least in part on detecting a collision between the second message and the second instance of the first message. In a second aspect, alone or in combination with the first aspect, the second message and the second instance of the first message are received in a same transmission time interval. In a third aspect, alone or in combination with one or more of the first through second aspects, the second message is received after the first instance. In a fourth aspect, alone or in combination with one or more of the first through third aspects, the second message is received before the first instance. In a fifth aspect, alone or in combination with one or more of the first through fourth aspects, the second message and the second instance of the first message are stored in a buffer. In a sixth aspect, alone or in combination with one or more of the first through fifth aspects, the second message is obtained based at least in part on performing interference cancellation for one or more other messages that collide with one or more other instances, wherein one or more resource sets used to communicate the one or more instances are identified based at least in part on the indication.

In a seventh aspect, alone or in combination with one or more of the first through sixth aspects, the indication explicitly indicates the plurality of resource sets. In an eighth aspect, alone or in combination with one or more of the first through seventh aspects, the indication indicates the plurality of resource sets using an index, wherein the index maps to a resource set pattern. In a ninth aspect, alone or in combination with one or more of the first through eighth aspects, the receiver operates in a random medium access control system where the plurality of resource sets are not indicated to or stored by the receiver prior to reception of an initial instance, of the plurality of instances, by the receiver.

In a tenth aspect, alone or in combination with one or more of the first through ninth aspects, each resource set, of the plurality of resource sets, indicates at least one of a time resource, a frequency resource, or a beam to be used for transmission of a corresponding instance of the message. In an eleventh aspect, alone or in combination with one or more of the first through tenth aspects, the beam is indicated using a beamforming pattern indication that indicates at least one of a pseudo-omnidirectional beam, a narrow beam, a set of directions for a set of beams, or a beam-sweeping pattern. In a twelfth aspect, alone or in combination with one or more of the first through eleventh aspects, the indication further indicates: a number of instances of the first message, a modulation and coding scheme (MCS) to be used for the plurality of instances, one or more transmission power control (TPC) parameters to be used for the plurality of instances, a hybrid automatic repeat request (HARQ) acknowledgement or negative acknowledgement (ACK/NACK) configuration to be used for the plurality of instances, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter, comprising:
   determining a plurality of resource sets to be used to transmit a corresponding plurality of instances of a message,
      wherein the plurality of resource sets are determined based at least in part on at least one of:
         a selection of a pseudo-random resource set pattern,
         a random selection of a resource set pattern from a set of preconfigured resource set patterns,
         an identifier associated with the transmitter, a receiver of the message, or a channel via which the transmitter communicates,
         a measurement of an energy level or an interference level associated with available resources,
         an indication received from another device, or
         a combination thereof,
      wherein each particular instance, of the plurality of instances, and corresponds to a resource set, of the plurality of resource sets, via which that particular instance is to be transmitted,
      wherein each particular instance includes a copy of the message and indicates the plurality of resource sets, and
      wherein each particular instance indicates the resource set via which that particular instance is to be transmitted and other resource sets included in the plurality of resource sets, and
      wherein each particular instance further indicates at least one of:
         a number of instances of the message,
         a modulation and coding scheme (MCS) to be used for the plurality of instances,
         one or more transmission power control (TPC) parameters to be used for the plurality of instances, a hybrid automatic repeat request (HARQ) acknowledgement or negative acknowledgement (ACK/NACK) configuration to be used for the plurality of instances, or a combination thereof; and transmitting an instance of the message, wherein the instance of the message includes the copy of the message and indicates the plurality of resource sets to be used to transmit the corresponding plurality of instances of the message.

2. The method of claim 1, wherein the plurality of resource sets are determined for a time window.

3. The method of claim 1, wherein each particular instance explicitly indicates the plurality of resource sets.

4. The method of claim 1, wherein each particular instance indicates the plurality of resource sets using an index, wherein the index maps to the resource set pattern.

5. The method of claim 1, wherein the transmitter operates in a random medium access control system where the plurality of resource sets are not indicated to or stored by a receiver of the instance prior to transmission of an initial instance, of the plurality of instances, by the transmitter.

6. The method of claim 1, wherein the plurality of resource sets are determined based at least in part on at least one of:
  a traffic type associated with the message,
  a latency requirement associated with the message,
  a reliability requirement associated with the message,
  whether the message includes control plane information,
  whether the message includes user plane information,
  whether the message is a unicast message,
  whether the message is a multicast message or a broadcast message, or
  a combination thereof.

7. The method of claim 1, wherein the plurality of resource sets are determined based at least in part on the selection of the pseudo-random resource set pattern.

8. The method of claim 1, wherein the plurality of resource sets are determined based at least in part on a determination of a number of instances of the message to be transmitted.

9. The method of claim 1, wherein each resource set, of the plurality of resource sets, indicates at least one of a time resource, a frequency resource, or a beam to be used for transmission of a corresponding instance of the message.

10. The method of claim 9, wherein the beam is indicated using a beamforming pattern indication that indicates at least one of a pseudo-omnidirectional beam, a narrow beam, a set of directions for a set of beams, or a beam-sweeping pattern.

11. The method of claim 1, wherein each particular instance indicates the number of instances of the message.

12. The method of claim 1, wherein at least one of the number of instances, the MCS, the one or more TPC parameters, or the HARQ ACK/NACK configuration are determined based at least in part on a traffic type associated with the message.

13. A transmitter for wireless communication, comprising:
  memory; and
  one or more processors coupled to the memory, the memory and the one or more processors configured to:
    determine a plurality of resource sets to be used to transmit a corresponding plurality of instances of a message, wherein each particular instance, of the plurality of instances, corresponds to a resource set, of the plurality of resource sets, via which that particular instance is to be transmitted,
    wherein the plurality of resource sets are determined based at least in part on at least one of:
      a selection of a pseudo-random resource set pattern,
      a random selection of a resource set pattern from a set of preconfigured resource set patterns,
      an identifier associated with the transmitter, a receiver of the message, or a channel via which the transmitter communicates,
      a measurement of an energy level or an interference level associated with available resources,
      an indication received from another device, or
      a combination thereof,
    wherein each particular instance includes a copy of the message and indicates the plurality of resource sets,
    wherein each particular instance indicates the resource set via which that particular instance is to be transmitted and other resource sets included in the plurality of resource sets, and
    wherein each particular instance further indicates at least one of:
      a number of instances of the message,
      a modulation and coding scheme (MCS) to be used for the plurality of instances,
      one or more transmission power control (TPC) parameters to be used for the plurality of instances,
      a hybrid automatic repeat request (HARQ) acknowledgement or negative acknowledgement (ACK/NACK) configuration to be used for the plurality of instances, or
      a combination thereof; and
    transmit an instance of the message, wherein the instance of the message includes the copy of the message and indicates the plurality of resource sets to be used to transmit the corresponding plurality of instances of the message.

14. The transmitter of claim 13, wherein the plurality of resource sets are determined for a time window.

15. The transmitter of claim 13, wherein each particular instance explicitly indicates the plurality of resource sets or indicates the plurality of resource sets using an index, wherein the index maps to a the resource set pattern.

16. The transmitter of claim 13, wherein the transmitter operates in a random medium access control system where the plurality of resource sets are not indicated to or stored by a receiver of the instance prior to transmission of an initial instance, of the plurality of instances, by the transmitter.

17. The transmitter of claim 13, wherein the plurality of resource sets are determined based at least in part on at least one of:
  a traffic type associated with the message,
  a latency requirement associated with the message,
  a reliability requirement associated with the message,
  whether the message includes control plane information,
  whether the message includes user plane information,
  whether the message is a unicast message,
  whether the message is a multicast message or a broadcast message, or
  a combination thereof.

18. The transmitter of claim 13, wherein the plurality of resource sets are determined based at least in part on the selection of the pseudo-random resource set pattern.

19. The transmitter of claim 13, wherein the plurality of resource sets are determined based at least in part on a determination of a number of instances of the message to be transmitted.

20. The transmitter of claim 13, wherein each resource set, of the plurality of resource sets, indicates at least one of a time resource, a frequency resource, or a beam to be used for transmission of a corresponding instance of the message.

21. The transmitter of claim 20, wherein the beam is indicated using a beamforming pattern indication that indicates at least one of a pseudo-omnidirectional beam, a narrow beam, a set of directions for a set of beams, or a beam-sweeping pattern.

22. The transmitter of claim 13, wherein each particular instance indicates the number of instances of the message.

23. The transmitter of claim 13, wherein at least one of the number of instances, the MCS, the one or more TPC parameters, or the HARQ ACK/NACK configuration are determined based at least in part on a traffic type associated with the message.

24. A non-transitory computer-readable medium storing one or more instructions for wireless communication, the one or more instructions comprising:
    one or more instructions that, when executed by one or more processors of a transmitter, cause the one or more processors to:
        determine a plurality of resource sets to be used to transmit a corresponding plurality of instances of a message, wherein each particular instance, of the plurality of instances, corresponds to a resource set, of the plurality of resource sets, via which that particular instance is to be transmitted,
        wherein the plurality of resource sets are determined based at least in part on at least one of:
            a selection of a pseudo-random resource set pattern,
            a random selection of a resource set pattern from a set of preconfigured resource set patterns,
            an identifier associated with the transmitter, a receiver of the message, or a channel via which the transmitter communicates,
            a measurement of an energy level or an interference level associated with available resources,
            an indication received from another device, or
            a combination thereof,
        wherein each particular instance includes a copy of the message and indicates the plurality of resource sets,
        wherein each particular instance indicates the resource set via which that particular instance is to be transmitted and other resource sets included in the plurality of resource sets, and
        wherein each particular instance further indicates at least one of:
            a number of instances of the message,
            a modulation and coding scheme (MCS) to be used for the plurality of instances,
            one or more transmission power control (TPC) parameters to be used for the plurality of instances,
            a hybrid automatic repeat request (HARQ) acknowledgement or negative acknowledgement (ACK/NACK) configuration to be used for the plurality of instances, or
            a combination thereof; and
        transmit an instance of the message, wherein the instance of the message includes the copy of the message and indicates the plurality of resource sets to be used to transmit the corresponding plurality of instances of the message.

25. The non-transitory computer-readable medium of claim 24, wherein the plurality of resource sets are determined for a time window.

26. The non-transitory computer-readable medium of claim 24, wherein each particular instance explicitly indicates the plurality of resource sets or indicates the plurality of resource sets using an index, wherein the index maps to the resource set pattern.

27. The non-transitory computer-readable medium of claim 24, wherein the transmitter operates in a random medium access control system where the plurality of resource sets are not indicated to or stored by a receiver of the instance prior to transmission of an initial instance, of the plurality of instances, by the transmitter.

28. The non-transitory computer-readable medium of claim 24, wherein the plurality of resource sets are determined based at least in part on at least one of:
    a traffic type associated with the message,
    a latency requirement associated with the message,
    a reliability requirement associated with the message,
    whether the message includes control plane information,
    whether the message includes user plane information,
    whether the message is a unicast message,
    whether the message is a multicast message or a broadcast message, or
    a combination thereof.

29. An apparatus for wireless communication comprising:
    means for determining a plurality of resource sets to be used to transmit a corresponding plurality of instances of a message,
        wherein the plurality of resource sets are determined based at least in part on at least one of:
            a selection of a pseudo-random resource set pattern,
            a random selection of a resource set pattern from a set of preconfigured resource set patterns,
            an identifier associated with the apparatus, a receiver of the message, or a channel via which the apparatus communicates,
            a measurement of an energy level or an interference level associated with available resources,
            an indication received from another device, or
            a combination thereof,
        wherein each particular instance, of the plurality of instances, corresponds to a resource set, of the plurality of resource sets, via which that particular instance is to be transmitted,
        wherein each particular instance includes a copy of the message and indicates the plurality of resource sets, and
        wherein each particular instance indicates the resource set via which that particular instance is to be transmitted and other resource sets included in the plurality of resource sets, and
        wherein each particular instance further indicates at least one of:
            a number of instances of the message,
            a modulation and coding scheme (MCS) to be used for the plurality of instances,
            one or more transmission power control (TPC) parameters to be used for the plurality of instances, a hybrid automatic repeat request (HARQ) acknowledgement or negative acknowledgement (ACK/NACK) configuration to be used for the plurality of instances, or a combination thereof; and means for transmitting an instance of the message, wherein the instance of the message includes the copy of the message and indicates the plurality of resource sets to be used to transmit the corresponding plurality of instances of the message.

30. The apparatus of claim 29, wherein the plurality of resource sets are determined for a time window.

* * * * *